US005659729A

United States Patent [19]
Nielsen

[11] Patent Number: 5,659,729
[45] Date of Patent: Aug. 19, 1997

[54] METHOD AND SYSTEM FOR IMPLEMENTING HYPERTEXT SCROLL ATTRIBUTES

[75] Inventor: Jakob Nielsen, Atherton, Calif.

[73] Assignee: Sun Microsystems, Inc., Mountain View, Calif.

[21] Appl. No.: 595,477

[22] Filed: Feb. 1, 1996

[51] Int. Cl.$^6$ .................................................. G06F 17/30
[52] U.S. Cl. ........................... 395/603; 395/610; 395/611; 395/774; 395/762; 395/793
[58] Field of Search .................................. 395/611, 603, 395/610, 774, 762, 793

[56] References Cited

U.S. PATENT DOCUMENTS 5,572,643   11/1996   Judson ..................................... 395/793

OTHER PUBLICATIONS

Article entitled "As We May Think", Vannevar Bush, Atlantic Monthly, Jul. 1945, reprinted with updated commentary Mar. 1996, pp. 35–67.

"A Brief History of HTML", http://www.fcs.uga.edu/ca/web_seminar/publishing/history.html, 3 Mar. 1997, pp. 1–4. Mar. 1997.

"Extensions to HTML 2.0", http://www.mcom.com/assist/net_sites/html_extensions.html, 3 Mar. 1997, pp. 1–4. Mar. 1997.

"Extensins to HTML 3.0", http://www.mcom.com/assist/net_sites/html_extensions3.html, 3 Mar. 1997, pp. 1–4. Mar. 1997.

"Publication History", http://www.bikent.edu.tr/pub/WWW/MarkUp/HTML.html, 3 Mar. 1997, pp. 1–2. Mar. 1997.

"Paul Lintz's Homepage", http://www.erols.com/plimtz/, p1, Document Source, p. 2., 3 Mar. 1997. Mar. 1997.

"Tools for creating Web Pages.(World Wide Web Home Page Creation)", Seybold Report on Publishing Systems, vol. 24, No. 17, 1 May 1995, pp. S14–S19. May 1995.

*Primary Examiner*—Paul V. Kulik
*Assistant Examiner*—Paul K. Lintz
*Attorney, Agent, or Firm*—Timothy J. Crean

[57] ABSTRACT

Embodiments of the present invention use a new extension to the HTML language to support remotely specified named anchors. A remotely specified named anchor, when embedded within a source document, instructs a browser program to access a portion of a destination document indicated in the remotely specified named anchor. When the browser program reads a remotely specified named anchor such as <a href=http://foo.com/bar.html/SCROLL="Some Text"> from the source document, the browser program performs the following steps: 1) the browser retrieves the destination file "bar.html" from the server "foo.com", 2) the browser searches the file bar.html for "Some Text", and 3) if the browser finds the character swing being searched for, then the browser displays the file bar.html, scrolled to the line containing the first character of the character string being searched for.

15 Claims, 6 Drawing Sheets

```
<!-- HEAD_START -->
<HTML>
<HEAD>
<TITLE>Sun Microsystems</TITLE>
<!--META NAME-"owner" VALUE="hooper@bcci.eng.sun.com" -->
</HEAD>

<BODY>
<!-- HEAD_END -->

<A HREF-"/cgi-bin/imagemap/960101/homepage.9601.map"><IMG BORDER-0 SRC-"/share/i
mages/homepage.9601.color.580x576.gif" ALT="Highly graphic homepage" ISMAP></A><
P>

Sun Microsystems <A HREF="/960101/index.textonly.html">text-only</A> home page.

<!-- FOOT_START -->
<HR>
<FONT SIZE=2> Questions or comments regarding this service?
<A HREF="/cgi-bin/comment-form.pl?/960101/index.html"><EM>webmaster@sun.com</EM>
</A></FONT>
<P>
<H5><A HREF="/share/text/SMIcopyright.html">Copyright</A> 1996 Sun Microsystems,
Inc., 2550 Gracia Ave., Mtn View, CA 94043-1100 USA. All Rights Reserved</H5>
</BODY>
</HTML>
<!-- FOOT_END -->
```

*FIG. 2*

```
<html>
<head>
<title>

</title>
</head>
<!--this is a comment-->
<body>

<address>

</address>
</body>
</html>
```

*FIG. 3*

| <start tag> | <endtag> | function |
|---|---|---|
| <html> | </html> | HTML document indicator. |
| <head> | </head> | Define document head. |
| <title> | </title> | Document title information. Should be descriptive, used in indexing and search engines. |
| <body> | </body> | Document body |
| <h (n) >, <h1>... <h6> | </h (n) >, </h1>... </h6> | Headings. h1 is largest, h6 is smallest |
| <! --- ---> | | Comment, No ending tag required |

*FIG. 4*

Paragraph Formatting

| <start tag> | <endtag> | function |
|---|---|---|
| <brl> | | Break, starts a new line, no ending tag required |
| <p> | | Paragraph (break plus space), no ending tag required |
| <hr> | | Horizontal rule (horizontal line) |
| <pre> | </pre> | Preformatted text, not processed by browser. Useful for keeping spaces in tables or lists formatted in a text editor. |
| <blockquote> | </blockquote> | Blockquote |

Character Formatting

| <start tag> | <endtag> | Logical or Physical | HTML function |
|---|---|---|---|
| <em> | </em> | Logical | *Emphasized* |
| <var> | </var> | Logical | Variable |
| <cite> | </cite> | Logical | Citation |
| <i> | </i> | Physical | *Italics* |
| <b> | </b> | Physical | Bold |
| <code> | </code> | Logical | Code |
| <samp> | </samp> | Logical | Sample |
| <kbd> | </kbd> | Logical | Keyboard entry |
| <tt> | </tt> | Physical | Teletype |
| <key> | </key> | Logical | Keyword |
| <dfn> | </dfn> | Logical | Definition |
| <strike> | </strike> | Physical | ~~Strike-through~~ |
| <strong> | </strong> | Logical | Strong |

*FIG. 5*

THOMAS JEFFERSON

THOMAS JEFFERSON WAS ONE OF THE DRAFTERS OF THE AMERICAN CONSTITUTION.

METHOD AND SYSTEM FOR IMPLEMENTING HYPERTEXT SCROLL ATTRIBUTES

FIELD OF THE INVENTION

Aspects of the present invention provide a method and system for remotely specifying which section of a hypertext document to display on a user's computer.

BACKGROUND OF THE INVENTION

HTML is a "markup" language which allows an author to turn a simple text document into a hypertext document for the World Wide Web ("the web"). FIG. 1 is an example of a hypertext document from Sun Microsystems as viewed through a browser from Netscape Communications, Inc. FIG. 2 illustrates the HTML source code which describes the hypertext document of FIG. 1.

The HTML markup language is analogous in some ways to the formatting codes used in word processing documents. A word processing document viewed through a word processing program is actually a combination of the text that you see and a series of hidden formatting codes (e.g., carriage return, bold, underline) which instruct the word processing program to display the word processing document in a specified way. Similarly, a hypertext document is actually a combination of the text that you see and a series of hidden "tags" or "anchors" (for new paragraphs, graphics images, hypertext links, etc.) which instruct the browser program to display the hypertext document in a specified way.

A hypertext document is usually broken down into sections, with each section delineated by one or more HTML tags. HTML tags are formatting codes surrounded by the characters < and > (less than and greater than symbols). Some HTML tags have a start tag and an end tag. In general, end tags are in the format </"symbol"> where the "symbol" is the character string found between the characters < and > in the start tag. FIG. 3 is an example of a series of HTML document tags forming a template for a typical hypertext document. For example, the document of FIG. 3 is defined as an HTML document using the tags <html> and </html>Then the "head" to the document, which typically includes a title, is defined using the tags <head>, </head>, <title>, and </title>, respectively. Following the head comes the "body" of the document which is often organized into subtopics with different levels of headings. The body is defined by the tags <body> and </body>. Headings are indicated by the tags <h#> and </h#>, where # is the level of the heading. Heading levels indicate the relative size of the heading. Heading level 1 is the largest heading size and heading level 6 is the smallest heading size. Finally, it is good practice to indicate the author of the document at the bottom of the document using the tags <address> and </address>. FIG. 4 summarizes this information in a table format.

Once the HTML template has been established, text is added to create a basic hypertext document. In order to improve readability, the author adds HTML character and paragraph formatting tags to the document. For example, the <p> tag instructs the browser to begin a new paragraph. If an author wants to highlight some text in bold, the author inserts the <b> tag at the beginning of the text to be highlighted and inserts a </b> tag at the end of the text to be highlighted. The tags <i> and </i> indicate text to display in italics. FIG. 5 illustrates additional tags for formatting characters and paragraphs.

If HTML was merely made up of the document, paragraph, and character formatting tags discussed above, it would only allow an author to define a document which stands by itself. Fortunately, additional HTML tags allow an author to "link" documents together. If a reader of a hypertext document wants to know more about a topic before reading the rest of the current hypertext document, the reader selects a "link" or "hot link", which retrieves and displays a new document that provides related information. FIG. 6 illustrates a hypertext document (i.e, a "source document") on Thomas Jefferson with a hot link named "the American Constitution". The link could take the reader to a second hypertext document (i.e., a "destination document") which, for example, displays the text of the American Constitution or which provides more information on Thomas Jefferson's role in the drafting of the American Constitution.

In HTML, a hot link to a destination document is made by placing a "reference anchor" around the text to be highlighted (e.g., "the American Constitution") and then providing a network location where the destination document is located. Reference anchors extend the idea of start and end tags. A reference anchor is created when the start tag <a> and the end tag </a> are placed around the text to be highlighted (e.g., <a> the American Constitution </a>). Then attribute information that identifies the network location of the destination document is inserted within the <a> reference tag. In HTML, the "href=" attribute, followed by the network location for the destination document, is inserted within the <a> tag. For example, <a href="network location for the destination document"> the American Constitution </a>illustrates the basic format for a reference anchor. On the web, network locations of hypertext documents are provided using the Universal Resource Locator ("URL") naming scheme. FIG. 7 illustrates the primary components of a URL.

A service type 701 is a required part of a URL. The service type tells the user's browser how to contact the server for the requested data. The most common service type is the HyperText Transport Protocol or http. The web can handle several other services including gopher, wais, ftp, netnews, and telnet and can be extended to handle new service types. A system name 703 is also a required part of a URL. The system name is the fully qualified domain name of the server which stores the dam being requested. A port 705 is an optional part of a URL. Ports are the network socket addresses for specific protocols. By default, http connects at port 80. Ports are only needed when the server does not communicate on the default port for that service. A directory path 707 is a required part of a URL. Once connected to the system in question, a path to the file must be specified. A filename 709 is an optional part of a URL. The file name is the data file itself. The server can be configured so that if a filename isn't specified, a default file or directory listing is returned. A search component 711 is another optional part of a URL. If the URL is a request to search a data base, the query can be embedded in the URL. The search component is the text after the ? or # in a URL.

Substituting the URL "http://system/dir/file.html" into the example above, the reference anchor:

<a href="http://system/dir/file.html/"> the America Constitution </a> identifies an html file to retrieve and display when a user selects "fie American Constitution" hot link.

Sometimes an author may want to direct the reader's attention not to the destination document as a whole but to a specific part of the destination document. For example, instead of pointing the reader to the beginning (i.e., the Preamble) of the American Constitution, an author may want to point the reader directly to the 10th Amendment (i.e., Article X) of the American Constitution. Hypertext links that point to a specific point in a destination document are known as named anchors. Named anchors are essentially modified reference anchors. Continuing with the example above, if an author wants to point to the section on the 10th Amendment within a destination document containing HTML source code for the entire American Constitution, then the author follows a two step process. First the author modifies the HTML source code for the destination document by inserting a "NAME" attribute within an <a> tag which is inserted before the start of the section on the 10th Amendment. For example, the tag <a NAME="10th Amendment"> Article X </a> could be inserted into the destination document's HTML, source code before the start of the section on Article X. To reference this point, the author of the source document creates a named anchor in the source document which uses a #character to reference the "10th Amendment" NAME attribute in the destination document. For example, the named anchor:

<a href="http://system/dir/file.html#10th Amendment"> the 10th Amendment </a> identifies the section on Article X as the section to retrieve and display when a user selects the hot link "the 10th Amendment".

An implicit assumption of the example set forth above is that the author of the source document has permission to edit and modify the destination document in order to add a "NAME" attribute before the section on Article X. At the very least, the author of the source document has to be able to convince the author of the destination document to add such a "NAME" attribute before the section on Article X. However, since the web is a distributed, network-based hypertext system, the author of the source document may in fact not have access to the destination document. Thus, it would be beneficial to provide a method and system which allows browsers to automatically display sections of destination documents, even though those sections do not include embedded NAME attributes.

SUMMARY OF THE INVENTION

Embodiments of the present invention use a new extension to the HTML language to support remotely specified named anchors. A remotely specified named anchor, when embedded within a source document, instructs a browser program to access a portion of a destination document indicated in the remotely specified named anchor. One benefit of the present invention over previously implemented named anchors is that embodiments of the present invention provide this functionality even when the indicated portion of the destination document does not contain a "NAME" attribute. In this way, an author of a source document can create a hot link which scrolls to an indicated portion of a destination document even though the author of the source document is unable to modify, or have modified, the source code of the destination document to include a "NAME" attribute.

In one embodiment, when the browser program reads a remotely specified named anchor such as:

<a href=http://foo.com/bar.html SCROLL="Some Text"> the browser program performs the following steps: 1) the browser retrieves the file "bar.html" from the server "foo.com",2) the browser searches the file bar.html for "Some Text", and 3) if the browser finds the character string being searched for, then the browser displays the file bar.html scrolled to the line containing the first character of the character string being searched for.

The present invention also provides graceful degradation to support legacy browsers. If a remotely specified named anchor such as:

<a href=http://foo.com/bar.html SCROLL="Some Text"> is read by a browser program which does not support the new HTML extension of the present invention then the legacy browser will simply ignore the SCROLL attribute and will instead display the destination file bar.html in the normal fashion, i.e., scrolled to the top of the file.

NOTATIONS AND NOMENCLATURE

The detailed descriptions which follow are presented largely in terms of methods and symbolic representations of operations on data bits within a computer. These method descriptions and representations are the means used by those skilled in the data processing arts to most effectively convey the substance of their work to others skilled in the art.

A method is here, and generally, conceived to be a self-consistent sequence of steps leading to a desired result. These steps require physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, or the like. It should be bourne in mind, however, that all of these and similar terms are to be associated with the appropriate physical quantities and are merely convenient labels applied to these quantities.

Useful machines for performing the operations of the present invention include general purpose digital computers or similar devices. The general purpose computer may be selectively activated or reconfigured by a computer program stored in the computer. A special purpose computer may also be used to perform the operations of the present invention. In short, use of the methods described and suggested herein is not limited to a particular computer configuration.

BRIEF DESCRIPTION OF THE DRAWINGS

FIG. 2 illustrates HTML source code which describes the hypertext document of FIG. 1.

FIG. 3 is an example of a series of HTML document tags forming a template for a typical hypertext document.

FIG. 4 summarizes information regarding HTML document tags.

FIG. 5 summarizes information regarding HTML character and paragraph tags.

DETAILED DESCRIPTION

Overview Of The Preferred Method

Embodiments of the present invention use a new extension to the HTML language to support remotely specified named anchors. A remotely specified named anchor, when embedded within a source document, instructs a browser program to access a portion of a destination document indicated in the remotely specified named anchor. When the browser program reads a remotely specified named anchor such as:

<a href=http://foo.com/bar.html SCROLL="Some Text"> from the source document, the browser program performs the following steps: 1) the browser retrieves the destination file "bar.html" from the server "foo.com", 2) the browser searches the file bar.html for "Some Text", and 3) if the browser finds the character string being searched for, then the browser displays the file bar.html, scrolled to the line containing the first character of the character string being searched for.

One benefit of the present invention over previously implemented named anchors is that embodiments of the present invention provide this functionality even when the indicated portion of the destination document does not contain a "NAME" attribute. In this way, an author of a source document can create a hot link which scrolls to an indicated portion of a destination document even though the author of the source document is unable to modify, or have modified, the source code of the destination document to include a "NAME" attribute.

Overview Of The Preferred System

Figure 1:
FIG. 1 is an example of a hypertext document from Sun Microsystems as viewed through a browser from Netscape Communications, Inc.
Figures 6, 7:
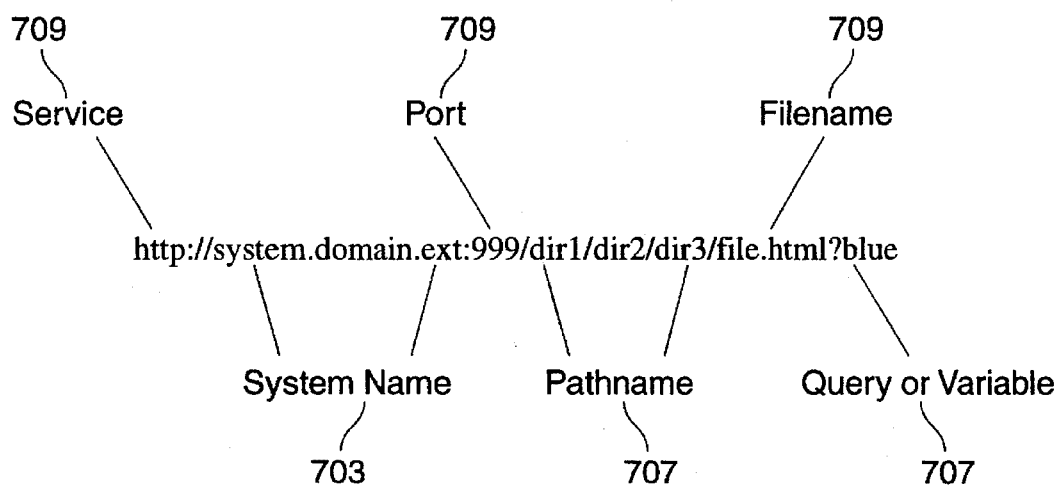
FIG. 6 illustrates a hypertext document on Thomas Jefferson with a hot link named "the American Constitution".
FIG. 7 illustrates the primary components of a Universal Resource Locator ("URL").
Figure 8:
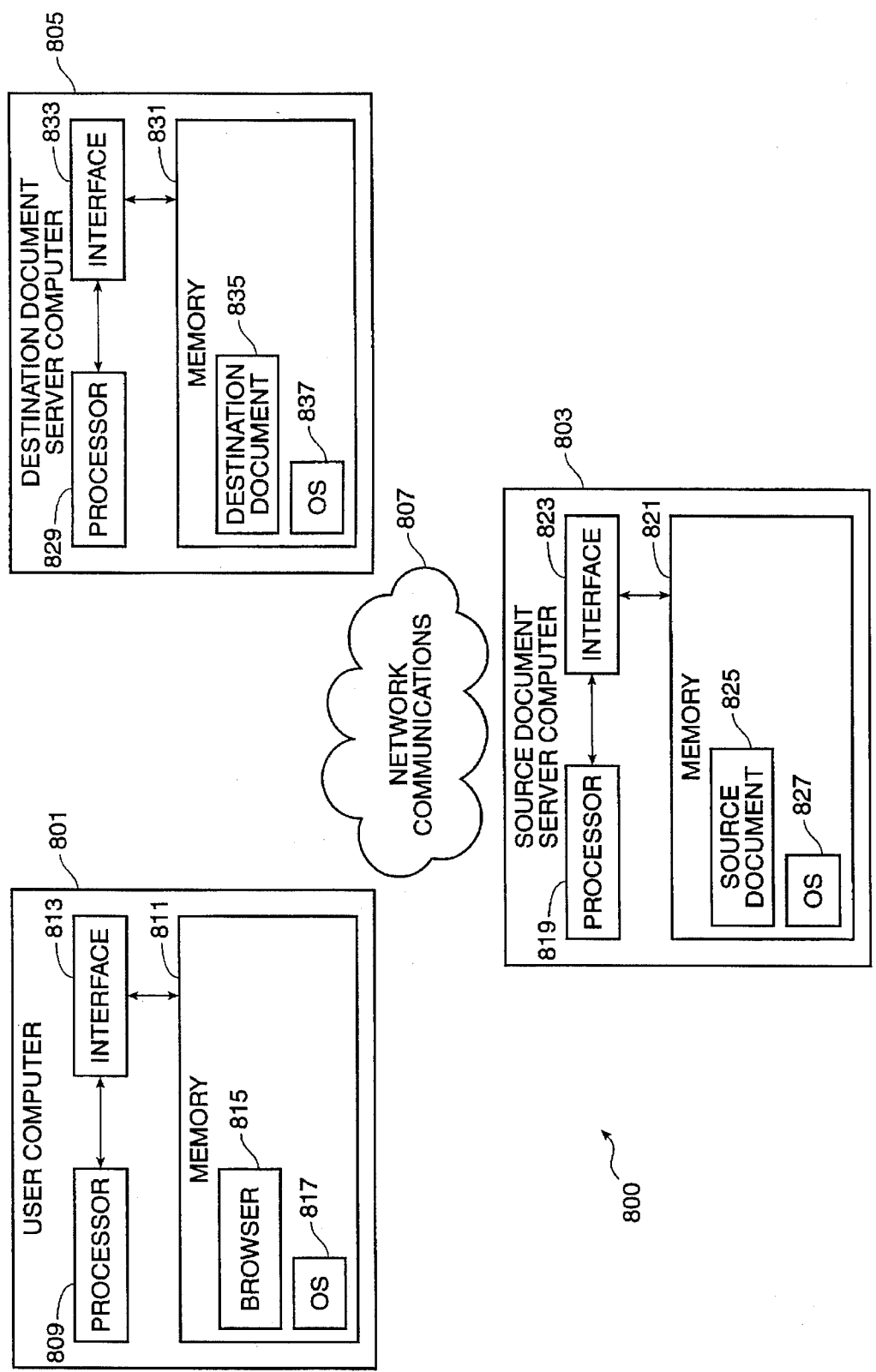
FIG. 8 is a block diagram of a computer system for practicing the preferred embodiment of the present invention.

FIG. 8 is a block diagram of a computer system 800 for practicing the preferred embodiment of the present invention. The computer system 800 includes a user computer 801, a source document server computer 803, a destination document server computer 805, and a network communications mechanism 807.

The user computer 801 includes a processor 809, a memory 811, and an interface 813 for facilitating input and output in the user computer 801. The memory 811 stores a number of items, including a browser 815, and an operating system 817. The preferred browser is a Java™ enabled browser such as Hot Java™ from Sun Microsystems, Inc., of Mountain View, Calif.[1] The preferred operating system is the Solaris™ operating system from Sun Microsystems, Inc.

1. Sun and Solaris are trademarks or registered trademarks of Sun Microsystems, Inc., in the United States and other countries.

The source document computer 803 includes a processor 819, a memory 821, and an interface 823 for facilitating input and output in the source computer 803. The memory 821 stores a number of items, including a source document 825, and an operating system 827. The preferred operating system is the Solaris™ operating system from Sun Microsystems, Inc. of Mountain View, Calif.

The preferred source document is a text document interspersed with constructs of the HTML markup language. Another possibility would be a text document marked up with SGML (Standard Generalized Markup Language). In general, this embodiment does not require that the source document is encoded in HTML, it is preferred, however, that the document contain one or more URLs. For example, this patent application could be a source document, and in fact it would be quite convenient to be able to refer in this patent application to specific examples of web pages, hot links, and reference anchors. If the source document is not encoded in HTML, SGML, or some other standard format, it becomes more difficult, but certainly not impossible, to recognize the URLs.

This embodiment of the invention does rely on the information being represented as text, though there is no requirement that the text be encoded in ASCII. For use with other languages, text may be encoded in Unicode (the preferred embodiment for non-European languages) or any other text encoding scheme that has the simple property of allowing the computer to compare a string with a substring of the entire file and determine whether the string is identical to the substring.

The destination document computer 805 includes a processor 829, a memory 831, and an interface 833 for facilitating input and output in the destination computer 805. The memory 831 stores a number of items, including a destination document 835, and an operating system 837. The preferred destination document is a text document interspersed with constructs of the HTML markup language. The preferred operating system is the Solaris™ operating system from Sun Microsystems, Inc. of Mountain View, Calif. The network communications mechanism 807 provides a mechanism for facilitating communication between the user computer 801, the source document server 803, and the destination document server 805.

It should be noted that the user computer 801, the source document server 803, and the destination document server 805 may all contain additional components not shown in FIG. 8. For example, each computer could also include some combination of additional components including a video display device, an input device, such as a keyboard, mouse, or pointing device, a CD-ROM drive, and a permanent storage device, such as a disk drive.

DETAILED DESCRIPTION OF THE PREFERRED EMBODIMENTS

Figure 9:
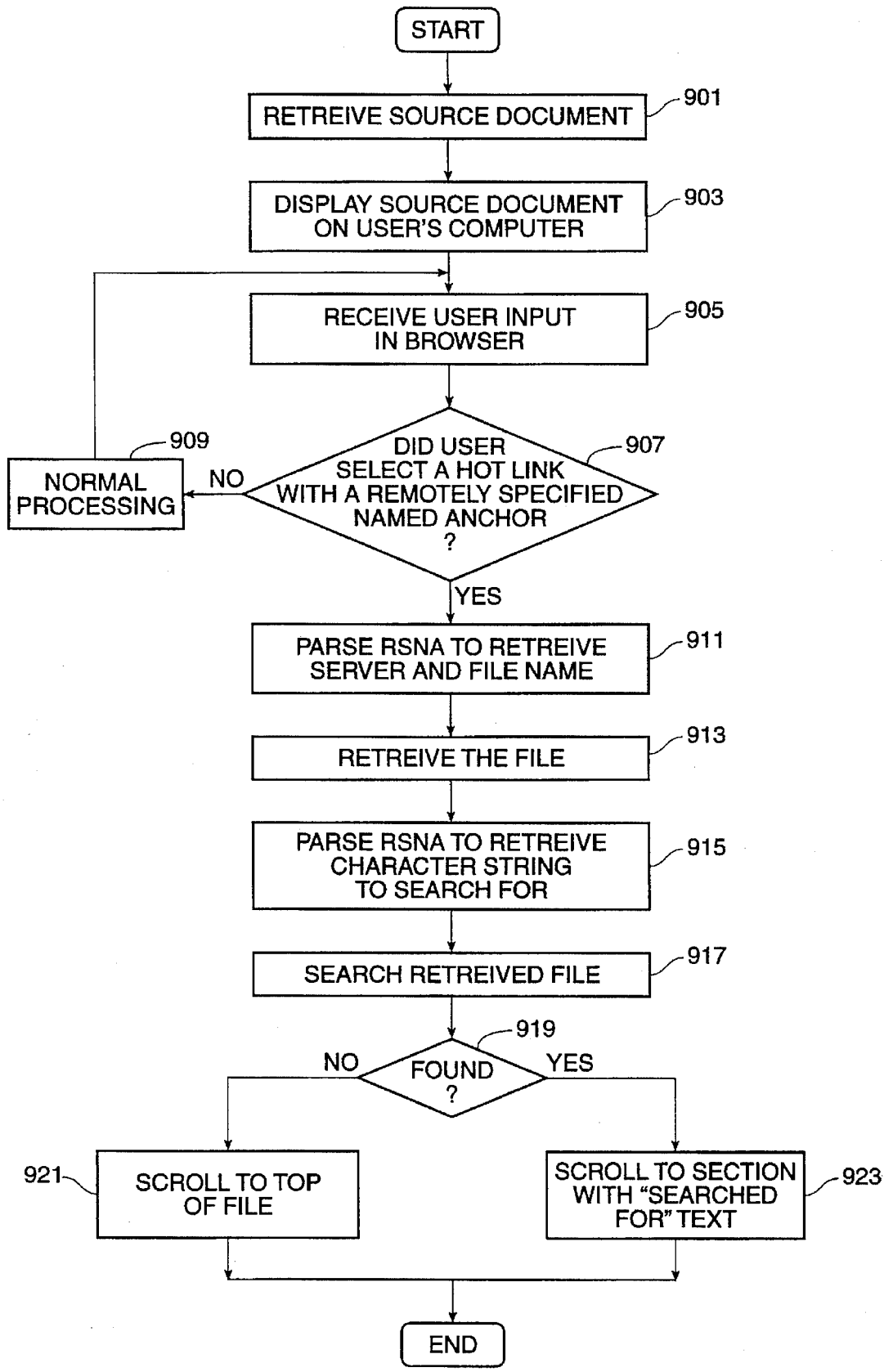
FIG. 9 is a flow diagram which illustrates the preferred steps taken to access a portion of a destination document identified in a remotely specified named anchor, even when the destination document does not contain a "NAME" attribute.

The preferred operation of the system in FIG. 8 is perhaps best described by way of example. FIG. 9 is a flow diagram which illustrates the preferred steps taken to access a portion of a destination document identified in a remotely specified named anchor, even when the destination document does not contain a "NAME" attribute. First, a browser program reads a remotely specified named anchor from a source document. Then the browser parses the remotely specified named anchor and retrieves the name of the file to access, and the network location of the server that stores the file. After retrieving the file, the browser searches the file for the indicated text. If the indicated text is found, then the browser displays the file starting at the first character of the indicated text.

In step 901 the browser retrieves a source document. Typically, the source document will be identified by a URL supplied by the user in an "Open File" dialog box displayed by the browser. In step 903 the browser displays the source document on the user's computer. In step 905 the browser receives input by the user on the displayed source document. In step 907 the browser determines whether the user selected a hot link containing a remotely specified named anchor. If the user requested an operation other than selecting a hot link containing a remotely specified anchor then the browser merely performs the requested operation using techniques available in the prior art (step 909). If, however, the user did select a hot link containing a remotely specified named anchor then, in steps 911 through 923, the browser processes the remotely specified named anchor in order to access a specified portion of a destination document identified in the remotely specified named anchor, even though the specified portion of the destination document does not contain an HTML "NAME" attribute associated with it.

In step 911 the browser parses the remotely specified named anchor to obtain the name of the file to retrieve, as well as the name of the server storing the file. In step 913 the browser retrieves the file from the server. In step 915 the browser parses the remotely specified named anchor in order to retrieve the character string for which to search. Those of ordinary skill in this art will understand that, alternatively, the browser could, in step 911, parse the remotely specified named anchor to retrieve the character string to search for. In step 917 the browser searches the retrieved file for the character string. If the character string is not found in the file (step 919) then the retrieved file is displayed to the user starting at the top of the file (step 921). If, however, the character string is found in the retrieved file then the browser displays the file scrolled to the line containing the first occurrence of the character string being searched for (step 923).

In this way, a new method and system are provided which access a portion of a destination document identified in a remotely specified named anchor, even when the destination document does not contain a "NAME" attribute.

One weakness of the preferred embodiment is that it does not allow the author of the source document to point to a second occurrence of a character string. Consider as an example the following file:

1. Socrates was a man.
2. All men are mortal.
3. Therefore, Socrates was mortal.
4. So his ultimate downfall was due to the fact that Socrates was a man. For example, the preferred embodiment will not link to the character string "Socrates was a man" in line 4 in response to the remotely specified named anchor <a href=http://foo.com/socratestory.html SCROLL:"Socrates was a man"> because the preferred embodiment will instead scroll to the first occurrence of the string "Socrates was a man" in line 1 of the file. This limitation is not severe, however, since it will normally be the case that the author can merely keep adding to the character string of choice until it is uniquely identified. For example, if it indeed was desired to link to the occurrence of "Socrates was a man" in line 4, then the author could merely search for the string "that Socrates was a man". In this way, the preferred embodiment would scroll the file to line 4, as desired. Though not a perfect solution, this solution will be adequate in almost all cases.

In general, embodiments of the invention apply to any system where it is desired to be able to point to a specific part of a larger whole even when one cannot get access to this larger whole to insert a reference marker.

There is an alternative, much simpler, way of solving one aspect addressed by the present invention, but it is *not* recommended. One could simply point to the character position (offset) of the desired scroll within the destination file. The reason this is not recommended is that the character position will change if the owner of the destination file edits it. Editing the file may also change the search string but this is much less likely to happen than the more common case where the author adds or deletes text in another part of the document.

While specific embodiments have been described herein for purposes of illustration, various modifications may be made without departing from the spirit and scope of the invention. Accordingly, the invention is not limited to the above described embodiments, but instead is defined by the claims which follow, along with their full scope of equivalents.

What is claimed is:

1. A method executed in a network computer system for facilitating access to a specified portion of data stored at a remote location, the method comprising the steps of:

retrieving a source document, the source document including hypertext links to other data on the network;

displaying the source document;

receiving input entered on the source document;

determining whether the input comprises selection of a remotely specified named anchor;

when the input comprises selection of a remotely specified named anchor, retrieving data indicated in the remotely specified named anchor and displaying a portion of the data specified in the remotely specified named anchor, wherein the specified portion of the data does not have a position marker associated with it.

2. The method of claim 1 wherein the step of determining further comprises the step of:

examining the remotely specified named anchor to determine whether it contains an attribute indicating that a specified portion of the retrieved data should be displayed.

3. The method of claim 2 wherein the attribute is a SCROLL attribute.

4. The method of claim 1 wherein the step of displaying the portion of the data specified in the remotely specified named anchor further comprises the step of:

examining the remotely specified named anchor to determine a character string to search for.

5. The method of claim 4 further comprising the steps of:

searching the retrieved data for the character string; and displaying the portion of the data containing the character string.

6. A network computer system for facilitating access to a specified portion of data stored at a remote location, the system comprising:

a mechanism configured to retrieve a source document, the source document including hypertext links to other data on the network;

a mechanism configured to display the source document;

a mechanism configured to receive input entered on the source document;

a mechanism configured to determine whether the input comprises selection of a remotely specified named anchor;

a mechanism configured to, when the input comprises selection of a remotely specified named anchor, retrieve data indicated in the remotely specified named anchor and display a portion of the data specified in the remotely specified named anchor, wherein the specified portion of the data does not have a position marker associated with it.

7. The system of claim 6 wherein the mechanism configured to determine further comprises:

a mechanism configured to examine the remotely specified named anchor to determine whether it contains an attribute indicating that a specified portion of the retrieved data should be displayed.

8. The system of claim 7 wherein the attribute is a SCROLL attribute.

9. The system of claim 6 wherein the mechanism configured to display the portion of the data specified in the remotely specified named anchor further comprises:

a mechanism configured to examine the remotely specified named anchor to determine a character string to search for.

10. The system of claim 9 further comprising:

a mechanism configured to search the retrieved data for the character string; and a mechanism configured to display the portion of the data containing the character string.

11. A computer program product for facilitating access to a specified portion of data stored at a remote location, the computer program product comprising:

code that retrieves a source document, the source document including hypertext links to other data on the network;

code that displays the source document;

code that receives input entered on the source document;

code that determines whether the input comprises selection of a remotely specified named anchor;

code that, when the input comprises selection of a remotely specified named anchor, retrieves data indicated in the remotely specified named anchor and displays a portion of the data specified in the remotely specified named anchor, wherein the specified portion of the data does not have a position marker associated with it, wherein the code resides on a tangible medium.

12. The computer program product of claim 11 wherein the code that determines further comprises:

code that examines the remotely specified named anchor to determine whether it contains an attribute indicating that a specified portion of the retrieved data should be displayed.

13. The computer program product of claim 12 wherein the attribute is a SCROLL attribute.

14. The computer program product of claim 11 wherein the code that displays the portion of the data specified in the remotely specified named anchor further comprises:

code that examines the remotely specified named anchor to determine a character string to search for.

15. The computer program product of claim 14 further comprising:

code that searches the retrieved data for the character string; and code that displays the portion of the data containing the character string.

* * * * *

(12) EX PARTE REEXAMINATION CERTIFICATE (5652nd)
United States Patent
Nielsen

(10) Number: US 5,659,729 C1
(45) Certificate Issued: Jan. 16, 2007

(54) METHOD AND SYSTEM FOR IMPLEMENTING HYPERTEXT SCROLL ATTRIBUTES

(75) Inventor: Jakob Nielsen, Atherton, CA (US)

(73) Assignee: Sun Microsystems, Inc., Mountain View, CA (US)

Reexamination Request:
No. 90/006,228, Mar. 1, 2002

Reexamination Certificate for:
Patent No.: 5,659,729
Issued: Aug. 19, 1997
Appl. No.: 08/595,477
Filed: Feb. 1, 1996

(51) Int. Cl.
*G06F 17/30* (2006.01)
*G06F 15/00* (2006.01)
*G06F 17/00* (2006.01)
*G06F 17/21* (2006.01)
*G06F 17/24* (2006.01)

(52) U.S. Cl. ............... 707/3; 707/100; 707/101; 707/102; 707/103 R; 707/104.1; 715/513; 715/516

(58) Field of Classification Search ............ 707/100, 707/101, 102, 103 R, 104.1; 715/513, 516
See application file for complete search history.

(56) References Cited

PUBLICATIONS

Amy Pearl, A Protocol for Open Linking, Nov. 1989, Hypertext '89 Proceedings, pp. 137–146.*
Dennis J. Bouvier, Versions and Standard of HTML, 1995, ACM SIGAPP Applied Computing Review, vol. 3, Issue 2, Fall 1995, pp. 9–15.*
Savola et al., Using HTML, 1995, Que Corporation, Especially chapter 16, Printed pp. 1–15.*
Title: "Sun's Link Service: A Protocol for Open Linking," by Amy Pearl, dated Nov. 1989, pp. 137–146.
Title: "Guidelines for Electronic Text Encoding and Interchange", by C. M. Sperberg–McQueen & Lou Burnard, Draft Verson 2, dated Jan. 21, 1993, pp. 1–37.

* cited by examiner

*Primary Examiner*—Frantz Coby

(57) ABSTRACT

Embodiments of the present invention use a new extension to the HTML language to support remotely specified named anchors. A remotely specified named anchor, when embedded within a source document, instructs a browser program to access a portion of a destination document indicated in the remotely specified named anchor. When the browser program reads a remotely specified named anchor such as <a href=http://foo.com/bar.html/SCROLL="Some Text"> from the source document, the browser program performs the following steps: 1) the browser retrieves the destination file "bar.html" from the server "foo.com", 2) the browser searches the file bar.html for "Some Text", and 3) if the browser finds the character swing being searched for, then the browser displays the file bar.html, scrolled to the line containing the first character of the character string being searched for.

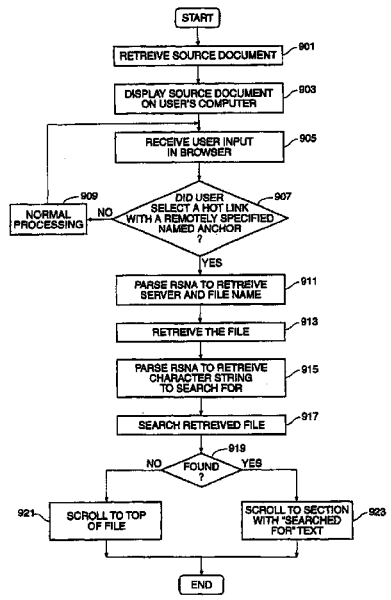

EX PARTE
REEXAMINATION CERTIFICATE
ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 2, lines 37–58:

A service type 701 is a required part of a URL. The service type tells the user's browser how to contact the server for the requested data. The most common service type is the HyperText Transport Protocol or http. The web can handle several other services including gopher, wais, ftp, netnews, and telnet and can be extended to handle new service types. A system name 703 is also a required part of a URL. The system name is the fully qualified domain name of the server which stores the dam being requested. A port 705 is an optional part of a URL. Ports are the network socket addresses for specific protocols. [By default, http connects at] *HTTP has a default* port *of* 80. Ports are only needed when the server does not communicate on the default port for that service. A directory path 707 is a required part of a URL. Once connected to the system in question, a path to the file must be specified. A filename 709 is an optional part of a URL. The file name is the data file itself. The server can be configured so that if a filename isn't specified, a default file or directory listing is returned. A search component 711 is another optional part of a URL. If the URL is a request to search a data base, the query can be embedded in the URL. The search component is the text after the ? or # in a URL.

THE DRAWING FIGURES HAVE BEEN CHANGED AS FOLLOWS:

"Port 709" has been re-labeled—Port 705—and "Service 709" has been re-labeled—Service 701—."Query/variable 707" has been re-labeled Query or variable 711.

AS A RESULT OF REEXAMINATION, IT HAS BEEN DETERMINED THAT:

Claims 1, 4, 6, 9, 11 and 14 are determined to be patentable as amended.

Claims 2, 3, 5, 7, 8, 10, 12, 13 and 15, dependent on an amended claim, are determined to be patentable.

New claims 16–47 are added and determined to be patentable.

1. A method executed in a network computer system for facilitating access to a specified portion of data stored at a remote location, the method comprising the steps of:
   retrieving a source document, the source document including hypertext links to other data on the network;
   displaying the source document;
   receiving input entered on the source document;
   determining whether the input comprises selection of a remotely specified named anchor;
   when the input comprises selection of a remotely specified named anchor, retrieving data indicated in the remotely specified named anchor;
   *searching the data for a string comprising characters identified in the remotely specified named anchor;*
   *scrolling to a position associated with the string comprising characters;* and
   displaying a portion of the data specified in the remotely specified named anchor *beginning from the position, wherein the specified portion of the data does not have a position marker associated with it*.

4. The method of claim 1 [wherein the step of displaying the portion of the data specified in the remotely specified named anchor] further [comprises the step of:] *comprising* examining the remotely specified named anchor to [determine a character string] *identify the string comprising characters* to search for.

6. A network computer system for facilitating access to a specified portion of data stored at a remote location, the system comprising:
   a mechanism configured to retrieve a source document, the source document including hypertext links to other data on the network;
   a mechanism configured to display the source document;
   a mechanism configured to receive input entered on the source document;
   a mechanism configured to determine whether the input comprises selection of a remotely specified named anchor;
   a mechanism configured to, when the input comprises selection of a remotely specified named anchor, retrieve data indicated in the remotely specified named anchor;
   *a mechanism configured to search the data for a string comprising characters identified in the remotely specified named anchor; and*
   *a mechanism configured to scroll to a position associated with the string comprising characters* and display a portion of the data specified in the remotely specified named anchor *beginning from the position, wherein the specified portion of the data does not have a position marker associated with it*.

9. The system of claim 6 [wherein the mechanism configured to display the portion of the data specified in the remotely specified named anchor] further [comprises] *comprising* a mechanism configured to examine the remotely specified named anchor to [determine a character string] *identify the string comprising characters* to search for.

11. A computer program product for facilitating access to a specified portion of data stored at a remote location, the computer program product comprising:
    code that retrieves a source document, the source document including hypertext links to other data on the network;
    code that displays the source document;
    code that receives input entered on the source document;
    code that determines whether the input comprises selection of a remotely specified named anchor;
    code that, when the input comprises selection of a remotely specified named anchor, retrieves data indicated in the remotely specified named anchor;

code that searches the data for a string comprising characters identified in the remotely specified named anchor;

code that scrolls to a position associated with the string comprising characters; and code that displays a portion of the data specified in the remotely specified named anchor *beginning from the position*, wherein the specified portion of the data does not have a position marker associated with it, *and wherein the code resides on a tangible medium.*

14. The computer program product of claim 11 [wherein the code that displays the portion of the data specified in the remotely specified named anchor] further [comprises:] *comprising* code that examines the remotely specified named anchor to [determine a character string] *identify the string comprising characters* to search for.

16. The method of claim 1, wherein the position is a first character of the string comprising characters.

17. The method of claim 16, wherein the step of scrolling further comprises moving a window within which to display the portion of the data from the first character.

18. The method of claim 17, wherein the step of moving further comprises causing the portion of the data to begin with text moved vertically within the window with respect to the first character.

19. The method of claim 17, wherein the step of moving further comprises causing the portion of the data to begin with text moved vertically and horizontally with respect to the first character.

20. The system of claim 6, wherein the position is a first character of the string comprising characters.

21. The system of claim 20, wherein the mechanism configured to scroll further comprises a mechanism configured to move a window within which to display the portion of the data from the first character.

22. The system of claim 21, wherein the mechanism configured to move the window further comprises a mechanism configured to cause the portion of the data to begin with text moved vertically within the window with respect to the first character.

23. The system of claim 21, wherein the mechanism configured to move the window further comprises a mechanism configured to cause the portion of the data to begin with text moved vertically and horizontally within the window with respect to the first character.

24. The computer program product of claim 11, wherein the position is a first character of the string comprising characters.

25. The computer program product of claim 24, wherein the code that scrolls further comprises code that moves a window within which to display the portion of the data from the first character.

26. The computer program product of claim 25, wherein the code that moves the window further comprises code that causes the portion of the data to begin with text moved vertically within the window with respect to the first character.

27. The computer program product of claim 25, wherein the code that moves the window further comprises code that causes the portion of the data to begin with text moved vertically and horizontally within the window with respect to the first character.

28. *A method executed in a network computer system for facilitating access to a specified portion of a remote document stored at a remote location, the method comprising the steps of:*

*retrieving a source document, the source document including at least one hypertext link;*

*displaying the source document;*

*receiving input associated with the hypertext link from the source document;*

*determining whether the input comprises selection of a remotely specified named anchor;*

*when the input comprises selection of a remotely specified named anchor, retrieving the remote document indicated in the remotely specified named anchor from a network location identified in the remotely specified named anchor;*

*searching the retrieved remote document for a character string identified in the remotely specified named anchor;*

*identifying a first character of the character string;*

*establishing an interface window within which the specified portion of the remote document can be displayed; and*

*displaying the specified portion of the remote document within the interface window scrolled down to begin from the first character of the character string, wherein the specified portion of the remote document does not have a position marker associated with it.*

29. *The method of claim 28, wherein the step of determining further comprises examining the remotely specified named anchor to determine whether it contains an attribute indicating that the specified portion of the retrieved remote document should be displayed from the first character of the character string.*

30. *The method of claim 29, wherein the attribute is a SCROLL attribute.*

31. *The method of claim 28, wherein the step of displaying further comprises vertically adjusting the relative location of the specified portion of the remote document within the interface window to begin with the first character of the character string.*

32. *The method of claim 28, wherein the step of displaying further comprises vertically and horizontally adjusting the specified portion of the remote document within the interface window to begin with the first character of the character string.*

33. *A network computer system for facilitating access to a specified portion of a remote document stored at a remote location, the system comprising:*

*a mechanism configured to retrieve a source document, the source document including at least one hypertext link;*

*a mechanism configured to display the source document;*

*a mechanism configured to receive input associated with the hypertext link from the source document;*

*a mechanism configured to determine whether the input comprises selection of a remotely specified named anchor;*

*a mechanism configured to, when the input comprises selection of a remotely specified named anchor, retrieve the remote document indicated in the remotely specified named anchor from a network location identified in the remotely specified named anchor;*

*a mechanism configured to search the retrieved remote document for a character string identified in the remotely specified named anchor;*

*a mechanism configured to identify a first character of the character string;*

*a mechanism configured to establish an interface window within which the specified portion of the remote document can be displayed; and* a mechanism configured to display the specified portion of the remote document within the interface window scrolled down to begin from the first character of the character string, wherein the specified portion of the remote document does not have a position marker associated with it.

34. The system of claim 33, wherein the mechanism configured to determine further comprises a mechanism configured to examine the remotely specified named anchor to determine whether it contains an attribute indicating that the specified portion of the retrieved remote document should be displayed from the first character of the character string.

35. The system of claim 34, wherein the attribute is a SCROLL attribute.

36. The system of claim 33, wherein the mechanism configured to display further comprises a mechanism configured to vertically adjust the relative location of the specified portion of the remote document within the interface window to begin with the first character of the character string.

37. The system of claim 33, wherein the mechanism configured to display further comprises a mechanism configured to vertically and horizontally adjust the specified portion of the remote document within the interface window to begin with the first character of the character string.

38. A computer program product for facilitating access to a specified portion of a remote document stored at a remote location, the method comprising the steps of:

code that retrieves a source document, the source document including at least one hypertext link;

code that displays the source document;

code that receives input associated with the hypertext link from the source document;

code that determines whether the input comprises selection of a remotely specified named anchor;

code that, when the input comprises selection of a remotely specified named anchor, retrieves the remote document indicated in the remotely specified named anchor from a network location identified in the remotely specified named anchor;

code that searches the retrieved remote document for a character string identified in the remotely specified named anchor;

code that identifies a first character of the character string;

code that establishes an interface window within which the specified portion of the remote document can be displayed; and code that displays the specified portion of the remote document within the interface window scrolled down to begin from the first character of the character string, wherein the specified portion of the remote document does not have a position marker associated with it.

39. The computer program product of claim 38, wherein the code that determines further comprises code that examines the remotely specified named anchor to determine whether it contains an attribute indicating that the specified portion of the retrieved remote document should be displayed from the first character of the character string.

40. The computer program product of claim 39, wherein the attribute is a SCROLL attribute.

41. The computer program product of claim 38, wherein the code that displays further comprises code that vertically adjusts the relative location of the specified portion of the remote document within the interface window to begin with the first character of the character string.

42. The computer program product of claim 38, wherein the code that displays further comprises code that vertically and horizontally adjusts the specified portion of the remote document within the interface window to begin with the first character of the character string.

43. A computer system for facilitating access to a specified portion of a remote document stored on a server system at a remote location, the computer system comprising:

a processor;

a memory coupled to the processor, the memory storing a browsing program module and a source document;

a display device coupled to the processor, the display device being capable of rendering a window associated with the browsing program;

an interface coupled to the processor, the interface being capable of communicating with the server system over a network; and an input device coupled to the processor for receiving input from a user;

the processor being operative to retrieve the source document from the memory, the source document including at least one hypertext link, display at least a part of the source document on the display device within the rendered window, the displayed part having the hypertext link, receive input from the user through the input device, the input being associated with the hypertext link from the source document, determine whether the input comprises selection of a remotely specified named anchor;

when the input comprises selection of a remotely specified named anchor, communicate a request to the server system through the interface, the request being for the remote document indicated in the remotely specified named anchor from a network location for the server system identified in the remotely specified named anchor, search the requested remote document for a character string identified in the remotely specified named anchor without requiring the server system to examine the contents of the remote document indicated in the remotely specified named anchor, identify a first character of the character string, and cause the specified portion of the remote document to be scrolled within the window on the display device to begin from the first character of the character string, wherein the specified portion of the remote document does not have a position marker associated with it.

44. The computer system of claim 43, wherein the processor is further operative to examine the remotely specified named anchor to determine whether it contains an attribute indicating that the specified portion of the retrieved remote document should be displayed on the display device from the first character of the character string.

45. The computer system of claim 44, wherein the attribute is a SCROLL attribute.

46. The computer system of claim 43, wherein the processor is further operative to vertically adjust the relative location of the specified portion of the remote document within the window rendered on the display device, the specified portion beginning with the first character of the character string.

47. The computer system of claim 43, wherein the processor is further operative to vertically and horizontally adjust the relative location of the specified portion of the remote document within the window rendered on the display device, the specified portion beginning with the first character of the character string.

* * * * *